(12) United States Patent
Martinez et al.

(10) Patent No.: US 10,156,912 B2
(45) Date of Patent: Dec. 18, 2018

(54) HIGH SPEED, HIGH PRECISION SIX DEGREE-OF-FREEDOM OPTICAL TRACKER SYSTEM AND METHOD

(71) Applicant: HONEYWELL INTERNATIONAL INC., Morris Plains, NJ (US)

(72) Inventors: Steven Martinez, Albuquerque, NM (US); Erik Erben, Rio Rancho, NM (US); Michael Rawson, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 57 days.

(21) Appl. No.: 14/951,805

(22) Filed: Nov. 25, 2015

(65) Prior Publication Data
US 2017/0147088 A1  May 25, 2017

(51) Int. Cl.
| | |
|---|---|
| *G06F 3/03* | (2006.01) |
| *F21V 19/00* | (2006.01) |
| *F21V 23/00* | (2015.01) |
| *G02B 27/01* | (2006.01) |
| *G06F 3/01* | (2006.01) |

(Continued)

(52) U.S. Cl.
CPC .......... *G06F 3/0308* (2013.01); *F21V 19/003* (2013.01); *F21V 23/003* (2013.01); *G01S 5/16* (2013.01); *G01S 5/163* (2013.01); *G02B 27/0172* (2013.01); *G06F 3/012* (2013.01); *H05B 33/0854* (2013.01); *H05B 37/029* (2013.01); *H05B 37/0227* (2013.01); *F21Y 2115/10* (2016.08)

(58) Field of Classification Search
CPC combination set(s) only.
See application file for complete search history.

(56) References Cited

U.S. PATENT DOCUMENTS

| | | | |
|---|---|---|---|
| 3,917,412 | A | 11/1975 | Stoutmeyer et al. |
| 4,649,504 | A | 3/1987 | Krouglicof et al. |

(Continued)

FOREIGN PATENT DOCUMENTS

| | | |
|---|---|---|
| EP | 0162713 A2 | 11/1985 |
| EP | 0480825 A2 | 4/1992 |
| GB | 2284957 A | 6/1995 |

OTHER PUBLICATIONS

Welch G., et al. "The HiBall tracker: High-Performance Wide-Area Tracking for Virtual and Augmented Environments," Proceedings of the 1996 IEEE International Conference on Robotics and Automation, Minneapolis, MN, USA, University of North Carolina at Chapel Hill, 1999.

(Continued)

*Primary Examiner* — Robin Mishler
(74) *Attorney, Agent, or Firm* — Lorenz & Kopf, LLP

(57) ABSTRACT

A six degree-of-freedom optical tracker system includes LEDs that are mounted on a structure, and are each configured to emit light. An LED controller is coupled to the LEDs and supplies drive current to each of the LEDs in a manner that causes the LEDs to sequentially and individually emit light. A single position sensing device that is spaced apart from each of the LEDs receives the light emitted from each of the LEDs and supplies position data for each LED. A processor receives the position data and determines the position and orientation of the structure relative to the single position sensing device.

8 Claims, 7 Drawing Sheets

(51) Int. Cl.
    *H05B 33/08*     (2006.01)
    *H05B 37/02*     (2006.01)
    *G01S 5/16*     (2006.01)
    *F21Y 115/10*     (2016.01)

(56) References Cited

U.S. PATENT DOCUMENTS

| | | | |
|---|---|---|---|
| 5,227,985 | A | 7/1993 | Dementhon |
| 6,183,086 | B1 * | 2/2001 | Neubert .............. A61B 3/0008 351/221 |
| 8,552,850 | B2 | 10/2013 | De Mers et al. |
| 2006/0011805 | A1 | 1/2006 | Spruck |
| 2009/0147993 | A1 | 6/2009 | Hoffmann et al. |
| 2012/0249013 | A1 * | 10/2012 | Valois ................ H05B 37/0227 315/291 |
| 2016/0364910 | A1 * | 12/2016 | Higgins ................ G06T 19/006 |

OTHER PUBLICATIONS

Ward, M., et al. "A Demonstrated Optical Tracker With Scalable Work Area for Head Mounted Display Systems," I3D '92 Proceedings of the 1992 symposium on Interactive 3D graphics, 1992.
Dementhon D F et al.; Model-Based Object Pose in 25 Lines of Code; International Journal of Computer Vision, Kluwer Academic Publishers, Norwell, US, vol. 15, No. 1; Jan. 1, 1995.
Extended EP Search Report for Application No. 16197620A-1812 dated Apr. 21, 2017.

* cited by examiner

HIGH SPEED, HIGH PRECISION SIX DEGREE-OF-FREEDOM OPTICAL TRACKER SYSTEM AND METHOD

TECHNICAL FIELD

The present invention generally relates to optical tracker systems and methods, and more particularly relates to a high speed, high precision six degree-of-freedom optical tracker system and method.

BACKGROUND

In recent years, near-to-eye (NTE) display devices have been developed and are becoming increasingly popular. Depending upon the particular end-use environment, these NTE display devices may be coupled to a helmet or headset of a viewer, and thus move with the changing position and angular orientation of the viewer's head. This advantageously allows the displayed information to be visible to the viewer regardless of the position and/or orientation of viewer's head.

It may thus be appreciated that determining the position and orientation of a viewer's head in six degrees-of-freedom (e.g., x, y, and z, and pitch, yaw, and roll) may be of particular importance to the overall functionality of NTE display devices. Many existing systems are relatively complex, heavy, and expensive. This is due, in part, to the fact that may are designed for military applications (e.g., helmet mounted systems), rather than a more compact, lightweight design, such as a visor.

Hence, there is a need for a high precision, high speed, relatively lightweight head tracking system that provides accurate and jitter-free registration and rendering of display elements on an NTE display device. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a six degree-of-freedom optical tracker system includes a structure, a plurality of light emitting diodes (LEDs), an LED controller, a position sensing device, and a processor. The structure is adapted to be disposed on a subject and is moveable to a position and orientation. The LEDs are mounted on the structure, and each LED is coupled to receive a drive current and is configured, upon receipt of the drive current, to emit light. The LED controller is coupled to the LEDs and is configured to supply the drive current to each of the LEDs in a manner that causes the LEDs to sequentially and individually emit light. The position sensing device is spaced apart from each of the LEDs. The position sensing device has a field of view (FOV) and is configured to receive the light emitted from each of the LEDs within the FOV and to supply position data for each LED. The processor is coupled to receive the position data supplied from the position sensing device and is configured, upon receipt thereof, to (i) determine the position and orientation of the structure relative to the position sensing device, (ii) determine if one or more of the LEDs is outside of the FOV of the position sensing device, and (iii) disable the one more LEDs determined to be outside of the FOV of the position sensing device.

In another embodiment, a six degree-of-freedom optical tracker system includes a structure, a plurality of light emitting diodes (LEDs), an LED controller, a single position sensing device, and a processor. The structure is adapted to be disposed on a subject is and moveable to a position and orientation. The LEDs are mounted on the structure, and each LED is disposed on the structure at a specific position relative to a reference position. Each LED is coupled to receive a drive current and is configured, upon receipt of the drive current, to emit infrared (IR) light. The LED controller is coupled to the LEDs and is configured to supply the drive current to each of the LEDs in a manner that causes the LEDs to sequentially and individually IR emit light. The single position sensing device is spaced apart from each of the LEDs, and is configured to receive the IR light emitted from each of the LEDs and to supply position data for each LED. The processor is coupled to receive the position data supplied from the single position sensing device and is configured to determine the position and orientation of the structure relative to the single position sensing device based on the position data supplied from the position sensing device and the specific position of each LED relative to the reference position.

In yet another embodiment, a method of detecting position and orientation of a structure using a single position detecting device that is spaced apart from the structure includes sequentially and individually supplying drive current from an LED controller to a plurality of light emitting diodes (LEDs) that are mounted on the structure to thereby sequentially and individually cause the LEDs to emit light, where each LED is mounted on the structure at a specific position relative to a reference position. Position data for each LED are generated, using the single position sensing device, from the light that is emitted from each of the LEDs. The position data and the specific position of each of the LEDs relative to the reference position are processed, in a processor, to determine the position and orientation of the structure relative to the single position sensing device. The LED controller is selectively commanded, using the processor, to vary the drive current to one or more of the LEDs.

Furthermore, other desirable features and characteristics of the optical tracking system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In view of the foregoing, although the disclosed systems and methods may be described, in some contexts, as being implemented to track the position and orientation of a user's head for use with a near-to-eye (NTE) display device, it will be appreciated that the systems and methods may also be used to track the position and orientation of numerous parts of a body, or of various non-human subjects, both animate and inanimate.

Figure 1:
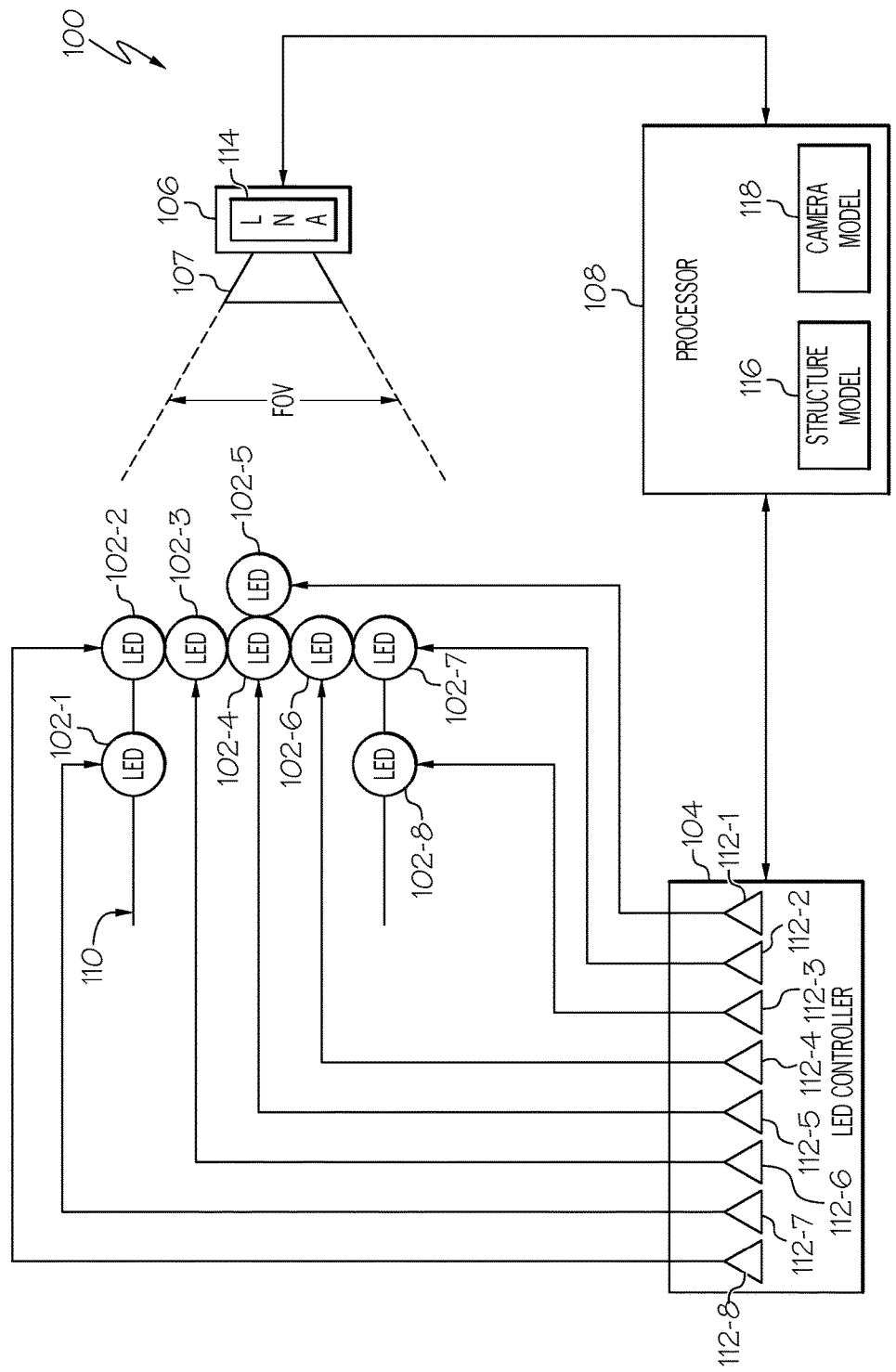
FIG. 1 depicts a functional block diagram of one embodiment of a six degree-of-freedom optical tracker system.

Referring now to FIG. 1, a functional block diagram of one embodiment of a six degree-of-freedom (6-DOF) optical tracker system 100 is depicted, and includes a plurality of light emitting diodes (LEDs) 102, an LED controller 104, a single position sensing device 106, and a processor 108. The LEDs 102 are mounted on a structure 110 that is adapted to be disposed on a subject and, when disposed on the subject, to be moveable to a position and orientation in six degrees-of-freedom.

Figure 2:
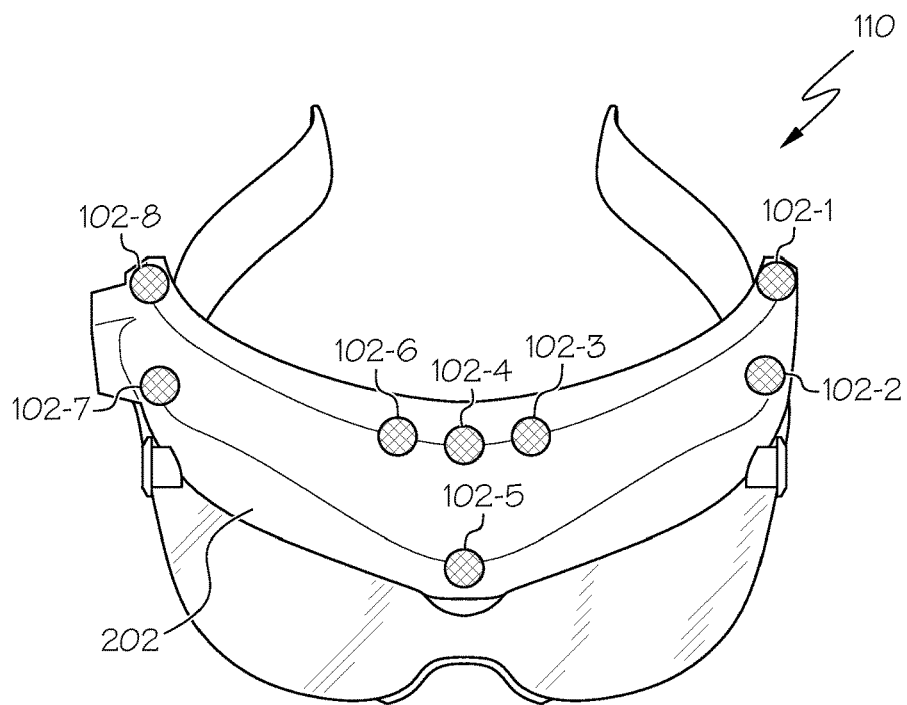
FIG. 2 depicts a front plan view of one example embodiment of a structure upon which LEDs of the system of FIG. 1 may be mounted.
Figure 3:
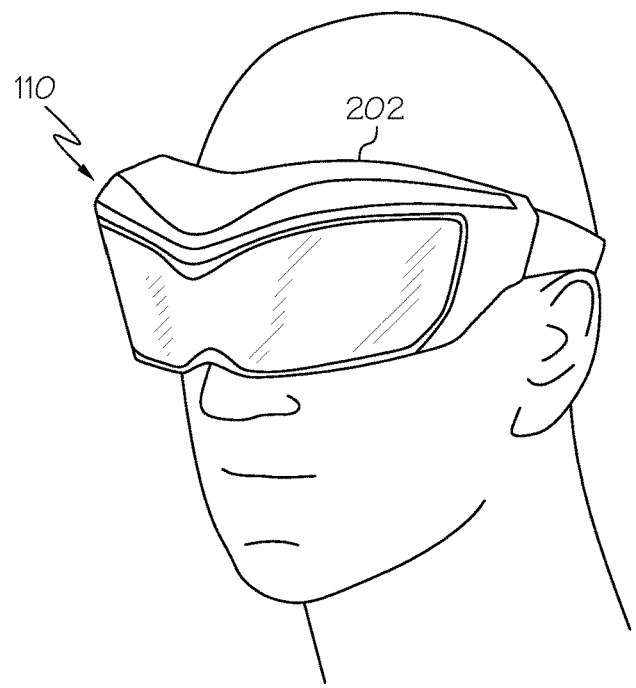
FIG. 3 depicts the structure of FIG. 2 disposed on the head of a user.

It will be appreciated that the structure 110 may vary in configuration and implementation, as may the subject on which the structure is disposed. For example, the structure may be a helmet, a band, a hat, or a visor, just to name a few. Moreover, the subject may be a human, a non-human, or an inanimate object such as, for example, a robotic device. In one particular embodiment, which is depicted in FIG. 2, the structure 110 is a visor 202 that is configured to be positioned, as depicted in FIG. 3, on the head of a human subject. As FIG. 2 also depicts, the LEDs 102 are disposed at specified positions on the visor 202. In particular, and as will be described more fully below, each LED 102 is disposed on the structure 110 at a specific position relative to a reference position.

Returning once again to FIG. 1, each of the LEDs 102 is coupled to receive a drive current from the LED controller 104 and is configured, upon receipt of the drive current, to emit light. Although the frequency of the light emissions from the LEDs 102 may vary, in one particular embodiment the light that each LED emits is in the infrared (IR) frequency spectrum. However, the light that each LED emits may also be ultraviolet (UV), visible, or x-ray, if needed or desired. It will additionally be appreciated that the number of LEDs 102 may also vary. In the depicted embodiment, the system 100 includes eight LEDs 102 (e.g., 102-1, 102-2, 102-3, . . . 102-8); however, the system 100 may be implemented with more (e.g., N-number of LEDs) or less than this number of LEDs.

The LED controller 104 is coupled to, and supplies the drive current to, each of the LEDs 102. More specifically, the LED controller 104 is configured to supply the drive current to each of the LEDs 102 in a manner that causes the LEDs 102 to sequentially and individually emit light. The LED controller 104 may be variously configured and implemented, but in the depicted embodiment the LED controller 104 includes a plurality of LED driver amplifiers 112 (e.g., 112-1, 112-2, 112-3, . . . 112-8). Each of the driver amplifiers 112 is associated with a different one of the LEDs 102, and is thus configured to supply the drive current to its associated LED 102. As will be described in more detail further below, each driver amplifier 112 is also configured, in response to commands from the processor 110, to vary the current it supplies to its associated LED 102.

The single position sensing device 106 is spaced apart from each of the LEDs 102 and is fixedly mounted. The position sensing device 106, which has a field of view (FOV), is configured to receive, via a lens system 107, the light that is emitted from each of the LEDs 102 within the FOV, and to supply position data for each of the LEDs 102 within the FOV. It will be appreciated that the position sensing device 106 may be implemented using any one of numerous known devices that are sensitive to the light emitted from the LEDs 102. For example, the position sensing device 106 may be implemented using a two-dimensional (2D) duo-lateral or tetra-lateral type photodiode position sensing device, just to name two types of non-limiting devices that may be used. For completeness, a simplified representation of a duo-lateral type photodiode position sensing device is depicted in FIG. 4, and will now be briefly described.

Figure 4:
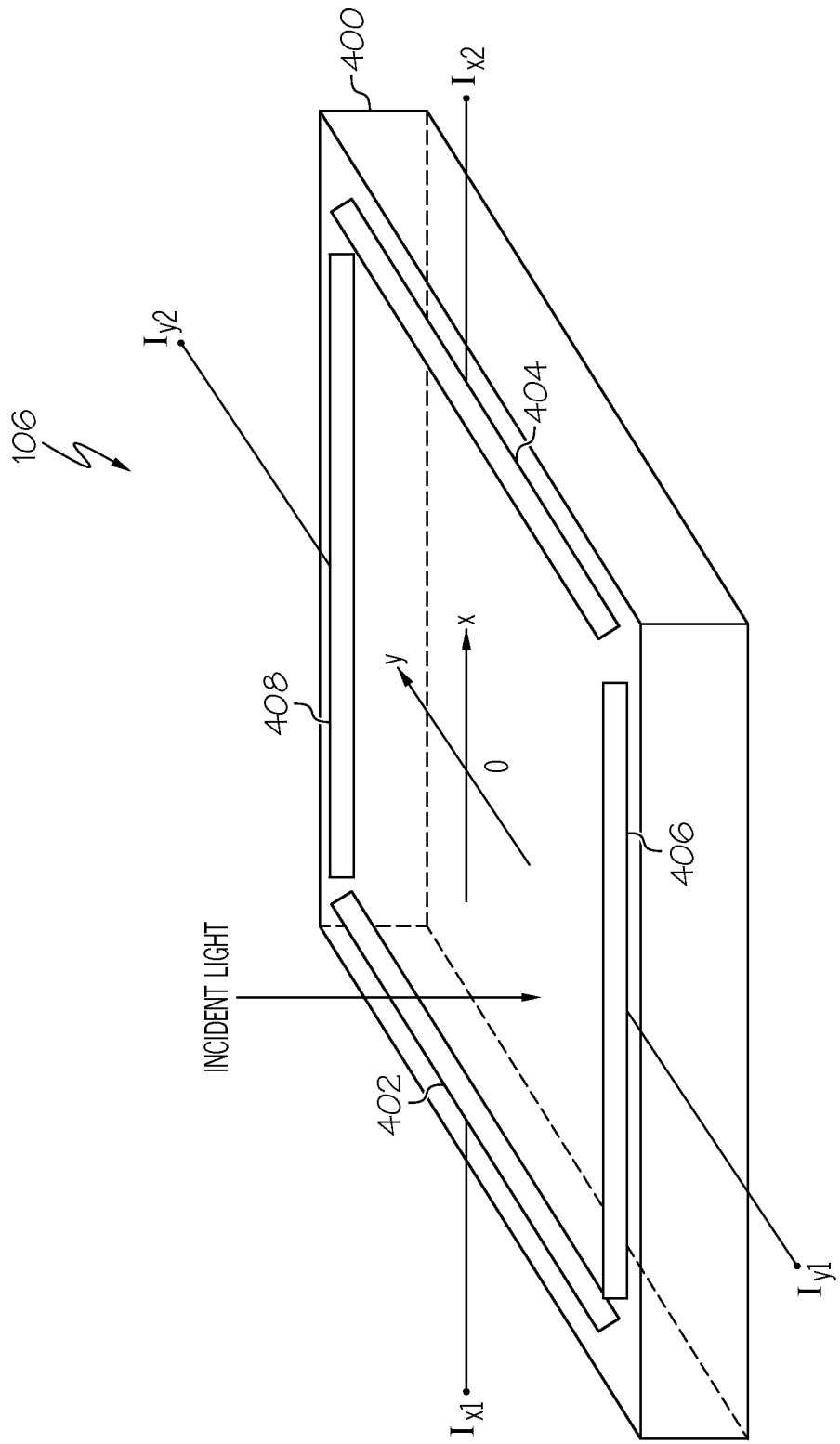
FIG. 4 depicts a simplified representation of an example embodiment of a duo-lateral type photodiode position sensing device that may be used in the system of FIG. 1.

As shown in FIG. 4, the duo-lateral type photodiode position sensing device 400 has two pair of electrodes formed thereon, which include a pair of X-electrodes 402, 404 and a pair of Y-electrodes 406, 408, arranged at right angles. Incident light directed at a point on the surface of the device 400 produces current in the electrodes ($I_{X1}$, $I_{X2}$, $I_{Y1}$, $I_{Y2}$) and the x- and y-positions at which the incident light strikes the surface may be determined therefrom. Returning to FIG. 1, it is seen that the depicted position sensing device 106 may additionally include various circuitry including, for example, one or more low-noise trans-impedance amplifiers (LNA) 114 (only one depicted). The LNA 114 is configured, among other functions, to convert the sensed current to a voltage for further processing. As will be described in more detail further below, the LNA 114 is also configured, in response to commands from the processor 110, to vary its gain.

Regardless of how the position sensing device 106 is specifically implemented, the processor 108 is coupled to receive the position data supplied from the single position sensing device 106 and is configured, upon receipt of the position data, to determine the position and orientation of the structure 110 relative to the position sensing device 106. It will be appreciated that although the processor 108 is depicted using a single functional block, it may be implemented using a plurality of digital and/or analog devices. Moreover, it may be implemented using a central processing unit (CPU), a graphics processing unit (GPU), a field programmable gate array (FPGA), an application specific integrated circuit (ASIC), a microcontroller, or any other logic device or combination thereof.

Regardless of how the processor 108 is specifically implemented, unlike presently known 6-DOF systems, the processor 108 determines the position and orientation of the structure 110 using position data from only a single position sensing device 106. To do so, the processor 108 implements one or more models to determine the position and orientation of the structure 110 based on the position data supplied from the position sensing device 106 and the specific position of each LED relative to the above-mentioned reference position.

More specifically, the processor 108, at least in the depicted embodiment, implements a structure model 116 and a camera model 118. The structure model 116 includes the 3D location of each LED 102 relative to a predefined origin on the structure 110. It will be appreciated that the predefined origin may be any one of numerous locations on the structure. The camera model 118 includes lens and sensor parameters that are determined during well-known camera calibration procedures. The image of each LED 102, as projected through space, the lens system 107, and onto the sensing device 400 provides the data that the processor 108 uses to calculate the position and orientation of the structure 110 relative to the position sensing device 106. It will be appreciated that the processor 108 could implement any one of numerous techniques to determine the position and orientation. One technique particular technique is disclosed in D. DeMenthon and L. S. Davis, "Model-Based Object Pose in 25 Lines of Code," International Journal of Computer Vision, 15, pp. 123-141, June 1995, and is referred to therein as "POSIT."

Figure 5:
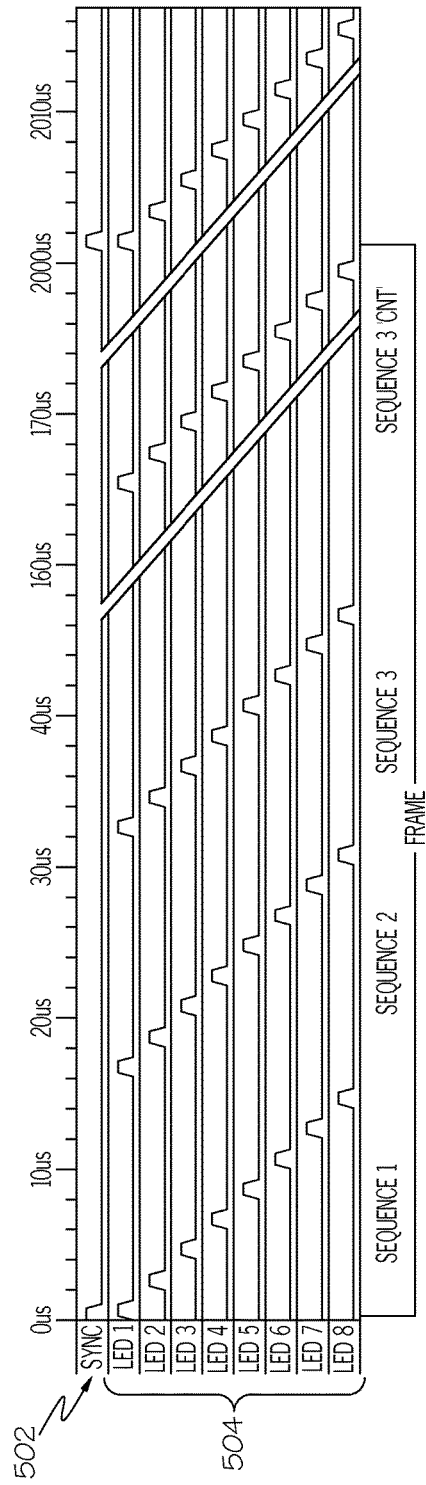
FIG. 5 depicts examples of various timing pulses generated in the system of FIG. 1.

In addition to determining the position and orientation of the structure 110 relative to the position sensing device 106, the processor 108 is also in operable communication with the LED controller 104 and is further configured to command the LED controller 104 to supply the drive currents to each of the LEDs 104. More specifically, the processor 108 is configured to supply a plurality of timing pulses to the LED controller 104, and the LED controller 104 is configured, upon receipt of the timing pulses, to supply the drive currents to each of the LEDs 104. Although the implementation of the timing pulses may vary, in the depicted embodiment, which is illustrated more clearly in FIG. 5, the timing pulses supplied from the processor 108 to the LED controller 104 include a series of sync pulses 502 and a plurality of individual LED pulses 504 (e.g., 504-1, 504-2, 504-3, . . . 504-8).

The sync pulses 502 are supplied at a predetermined periodicity. It will be appreciated that the predetermined periodicity may vary. In the depicted embodiment the set periodicity is approximately 200 μsec, but this periodicity is merely exemplary of one embodiment, and may vary as needed or desired. Regardless of the predetermined periodicity, the individual LED pulses 504 are supplied between each of the sync pulses 502. As may be readily appreciated, and as FIG. 4 also depicts, each the individual LED pulses 504 is associated with a different one of the LEDs 102, and each of the individual LED pulses 504 is supplied a predetermined number of times between each of the sync pulses 502. It will be appreciated that the predetermined number of times that each of the LED pulses 504 is supplied between each sync pulse 502 may vary, and may be programmable.

Figure 6:
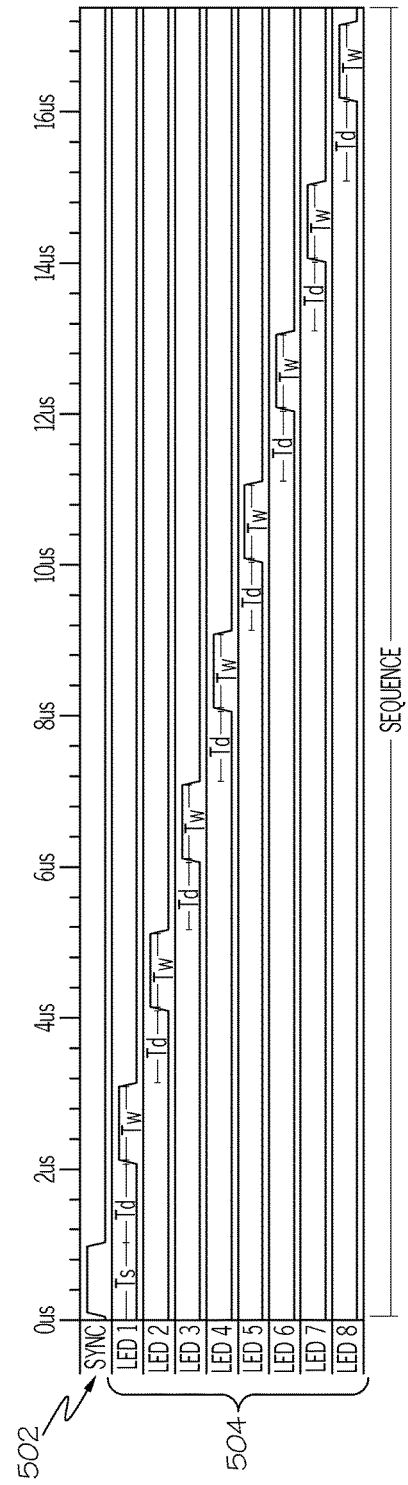
FIG. 6 depicts a close-up view of a portion of the timing pulses depicted in FIG. 5.

With reference now to FIG. 6, which provides a close-up view of the circled portion of the graph depicted in FIG. 4, it is seen that the processor 108 also implements an inter-LED delay time (Td) both after it supplies the sync pulse 502 and between each LED pulse 504. The inter-LED delay time allows the position sensing detector 106 to detect background ambient light conditions, and supply data representative thereof to the processor 108. The processor 106 may then compensate, as needed, the position data for the background ambient light. It will be appreciated that the inter-LED delay time (Td) and the widths of the sync pulse 502 (Ts) and the LED pulses 504 (Tw) may also be programmable.

From the above, it may be appreciated that there is one sync pulse per frame (200 μsec apart) to synchronize the timing of the LED controller 104 and the position sensing device 106. The LEDs 102 then flash in sequence a number of times (1 up to 10 times) for each frame. The position sensing device 106 acquires data at precise times when each LED 102 is on, and also when each is off for ambient compensation. The frame cycle then repeats.

The processor 108 is also preferably configured, upon receipt of the position data, to perform basic validity checks. For example, the processor 108, based on the position data supplied from the position sensing detector 106, may identify when the position sensing detector 106 is in saturation, may determine whether or not each of the LEDs 102 is within the FOV of the position sensing detector 106, and may command the LED controller 104 to vary the drive current to one or more of the LEDs 102, vary the gain of the LNA 114, or both.

The processor 108 may implement the validity checks using any one of numerous processes. In the depicted embodiment, however, the processor implements the validity checks based on the relative magnitudes of the electrode currents due to LED emissions and ambient conditions ($I_{X1(s-a)}$, $I_{X2(s+a)}$, $I_{Y1(s+1)}$, $I_{Y2(s+a)}$). For example, the processor 108 determines when the position sensing detector 106 is in saturation by comparing the sum of the magnitudes of electrode currents (e.g., $I_{X1(s+a)}+I_{X2(s+a)}$ or $I_{Y1(s+a)}+I_{Y2(s+a)}$) to a predetermined and configurable saturation threshold current value (PSD_Sat_Thr). If the sum of the electrode current magnitudes exceeds the predetermined saturation threshold current value, then the position sensing device 106 is in saturation. This also means that the determined position is invalid and that the LED 102 drive current should be reduced.

The processor 108 determines that each individual LED 102 is within the FOV of the position sensing device 106 by comparing the sum of the magnitudes of the electrode currents (e.g., $I_{X1(s+a)}+I_{X2(s+a)}$ or $I_{Y1(s+a)}+I_{Y2(s+a)}$) to a predetermined and configurable visual threshold current value (LED_Vis_Thr). More specifically, if the sum of the electrode current magnitudes due to LED emissions and ambient conditions exceeds the sum of the electrode current magnitudes due to ambient conditions and predetermined visual threshold current value (e.g., $I_{X1(s+a)}+I_{X2(s+a)}>I_{X1(a)}+I_{X2(a)}+$ LED_Vis_Thr, or $I_{Y1(s+a)}+I_{Y2(s+a)}>I_{Y1(a)}+I_{Y2(a)}+$LED_Vis_Thr), then the LED 102 is within the FOV, otherwise it is not. It will be appreciated that he visual threshold current value is selected to provide a minimum offset over that of the ambient light conditions to ensure an indirect light source or reflection does not cause a false negative.

The processor 108 determines whether it needs to command the LED controller 104 to vary the drive current to one or more of the LEDs 102, vary the amplifier gain of one or more of the driver amplifiers 112, or both by also comparing electrode currents to predetermined and configurable threshold current values. In particular, if an electrode current due to LED emissions and ambient conditions exceeds a predetermined and configurable high threshold current value (High_Thr) (e.g., ($I_{X1(s+a)}$ or $I_{X2(s-a)}$ or $I_{Y1(s+a)}$ or $I_{Y2(s+a)}>$ High_Thr), then this indicates that the LNA 114 is saturating and thus the position data is invalid. In response, the processor 108 will reduce the gain of the LNA 114, command the LED controller 104 to reduce the LED drive current, or both.

On the other hand, if the sum of the electrode current magnitudes due to LED emissions and ambient conditions is less than a predetermined and configurable low threshold current value (Low_Thr) (e.g., $I_{X1(s+a)}+I_{X2(s+a)}<\text{Low\_Thr}$, or $I_{Y1(s+a)}+I_{Y2(s+a)}<\text{Low\_Thr}$), then this indicates that the signal level is below optimum. In response, the processor 108 will increase the gain of the LNA 114, command the LED controller 104 to increase the LED drive current, or both.

Figure 7:
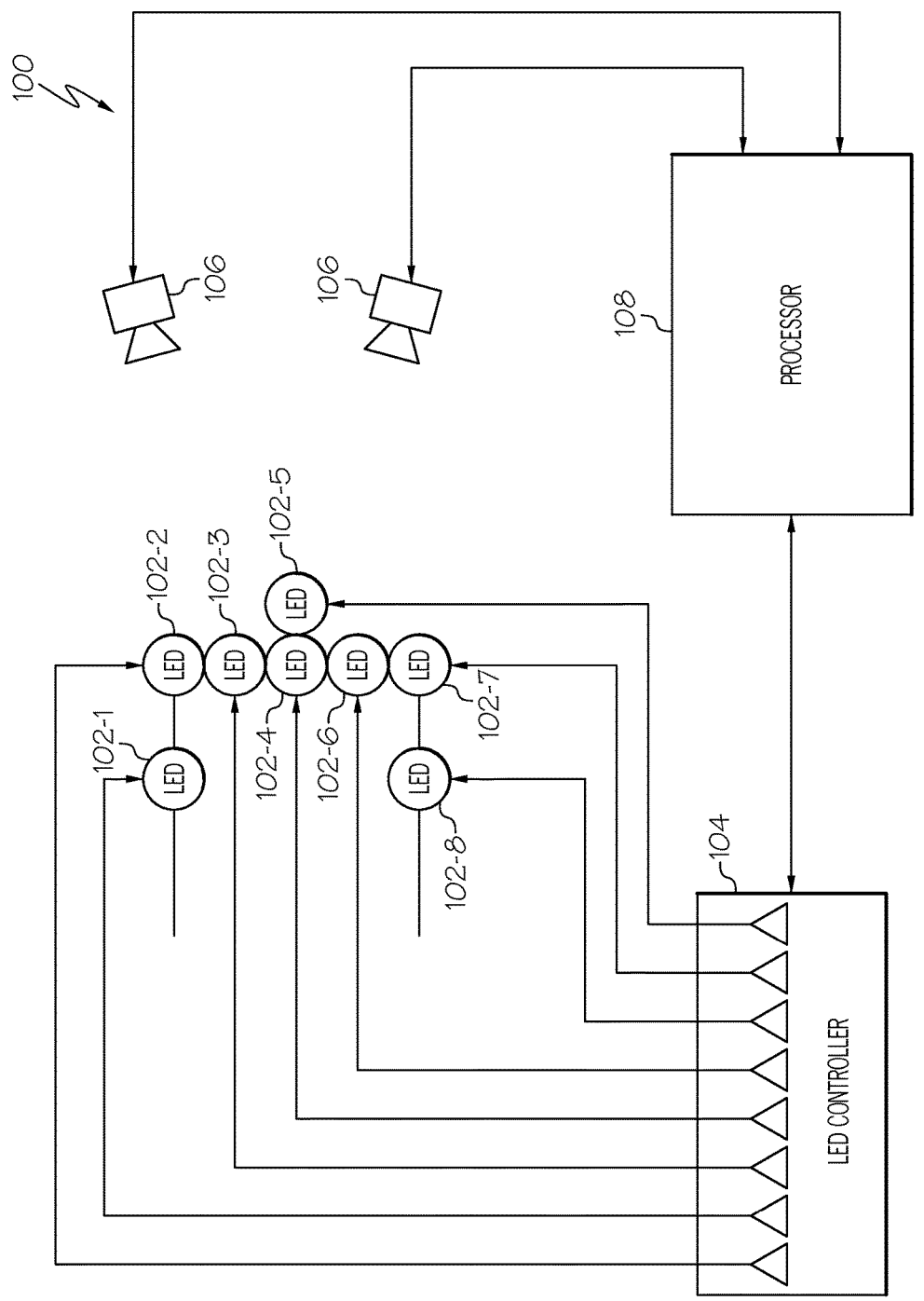
FIG. 7 depicts a functional block diagram of another embodiment of a six degree-of-freedom optical tracker system.

It should be noted that although the 6-DOF system 100 depicted in FIG. 1 is implemented with only a single positions sensing device 106, it could be implemented, if desired, with two or more position sensing devices 106. Such a system, which includes two position sensing devices 106, is depicted in FIG. 7. Unlike presently known 6-DOF sensing systems, however, the additional one or more position sensing devices 106 are not relied to determine the position and orientation of the structure 110. Rather, the additional position sensing device(s) 106 will increase the overall FOV of the system 100. The increased FOV, together with the overlapping coverage of the LEDs 102 and improved algorithms, may increase the overall accuracy of the system.

Figure 8:
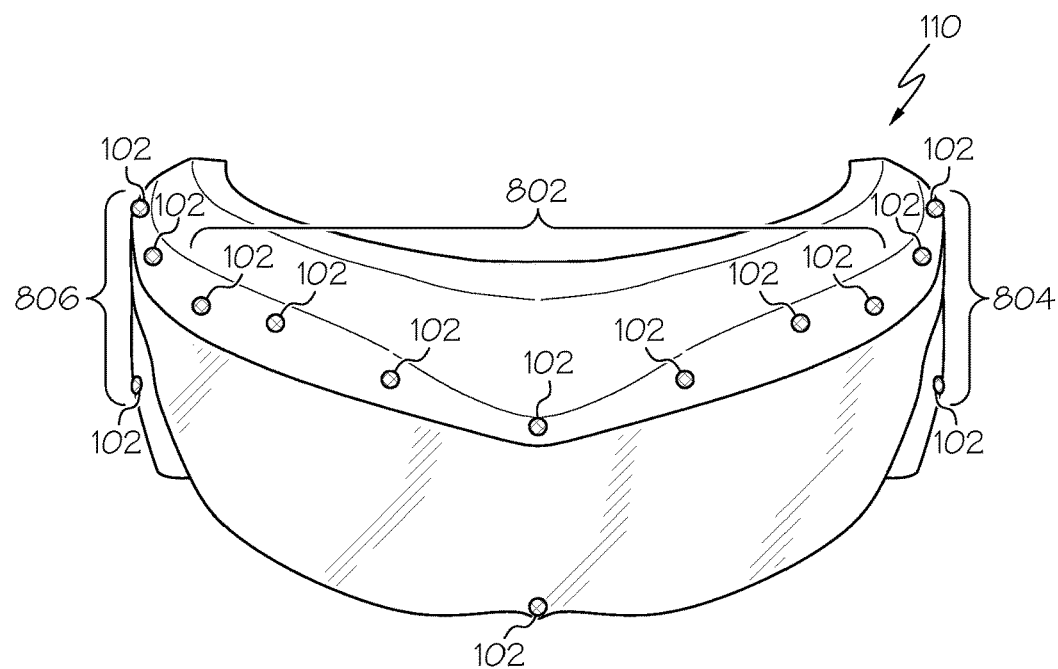
FIGS. 8 and 9 depict front and side perspective views of another example embodiment of a structure upon which LEDs of the systems of FIGS. 1 and 7 may be mounted.
Figure 9:
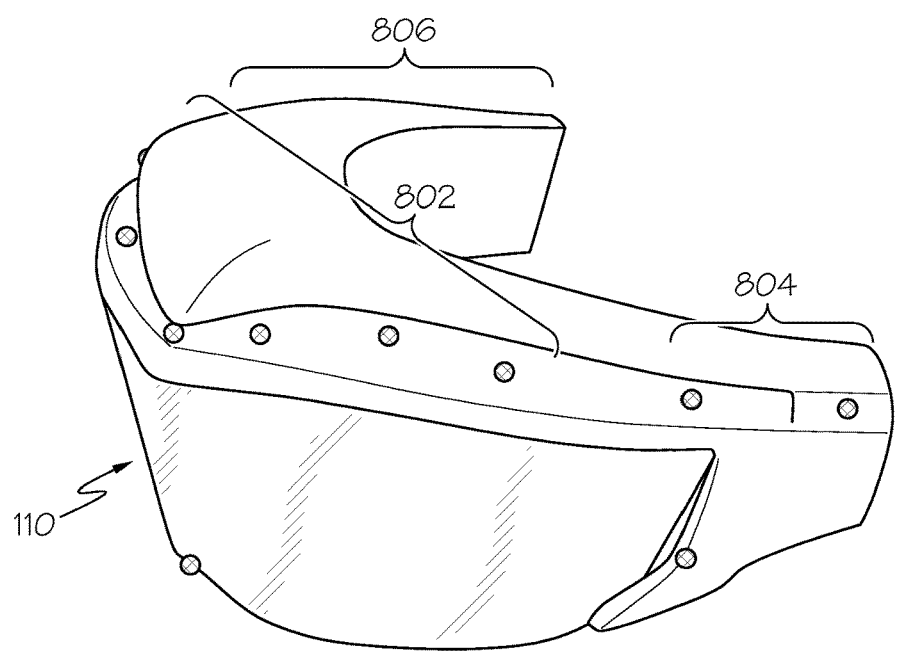

In order to maximize the LED coverage in the FOV of the position sensing device(s) 106 of the systems 100 depicted FIGS. 1 and 7, while minimizing stray light, the number and positioning of LEDs 102 on the structure 110 may also be varied. For example, in one embodiment, which is depicted in FIGS. 8 and 9, the structure 110, which is implemented as a visor, includes a first plurality of LEDs 102 on a front portion 802 of the visor, and a second plurality of LEDs 102 on each of the sides 804, 806 of the visor. It will be appreciated that the number and location of the LEDs 102 may vary. Preferably the number of LEDs 102 is selected to ensure that the position and orientation of the structure 110 is determined with sufficient accuracy. In the depicted embodiment, eight LEDs 102 are disposed on the front portion 802 of the visor, and three LEDs 102 are disposed on each of the sides 804, 806 of the visor.

Figure 10:
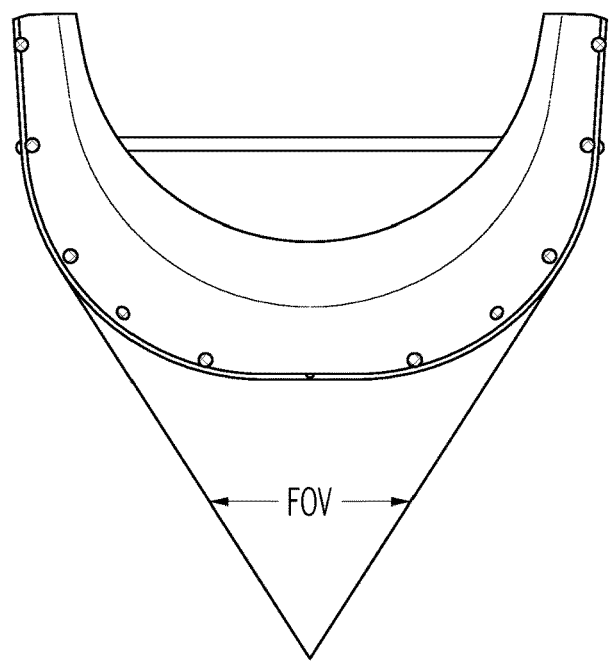
FIGS. 10 and 11 depict top views of the structure of FIGS. 8 and 9 in two different orientations.
Figure 11:
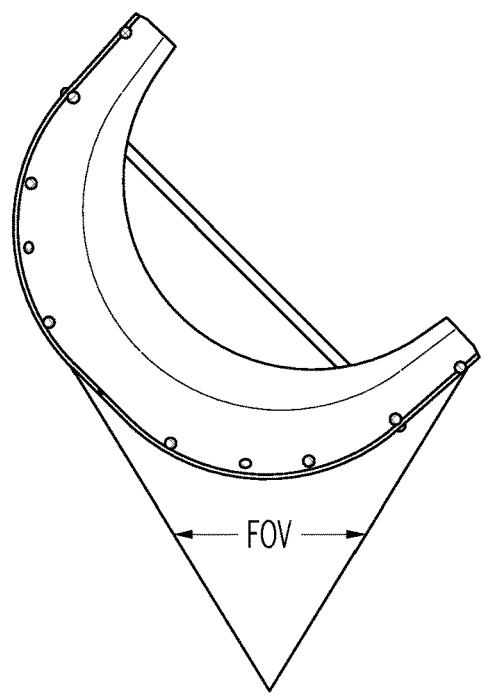

Although the number of LEDs 102 disposed on the structure 110 is increased, the processor 108 is configured to illuminate only a portion of the LEDs 102. In particular, only those LEDs 102 within the FOV of the position sensing device(s) 106. For example, and with reference to FIG. 10, the LEDs 102 disposed on the front portion 802 of the visor are within the FOV of the position sensing device(s) 106. Thus, these LEDs 102 are illuminated, whereas the LEDs 102 on the sides 804, 806 of the visor are disabled. However, as depicted in FIG. 11, when a user varies the position of the visor so that one or more of the LEDs 102 on the front portion 802 are no longer all within the FOV of the position sensing device(s) 106, the processor 108 detects this and, based on the last known location and movement trend, determines which LEDs 102 are likely within the FOV. The processor 108 then illuminates only the LEDs 102 within the FOV, and disables those that are no longer in the FOV.

Disabling the LEDs 102 outside of the FOV of the position sensing device(s) 106 reduces light noise that may be caused by reflections off surfaces in the user's proximity from LEDs 102 outside of the FOV. This improves system accuracy and minimizes the possibility of interfering with an adjacent tracking system that may be used by another user (e.g., pilot/co-pilot). In addition, by not illuminating LEDs 102 outside of the FOV, the amount of heat generation is reduced. By doing this in near real time, the power requirements of the configurations depicted in FIGS. 1 and 7 are maintained, and the position sensing device(s) 106 has a maximum count of illuminated LEDs 102 in its FOV, thus maintaining maximum position accuracy while minimizing stray light emission.

The system and method described herein provides a high precision, high speed, relatively lightweight tracking system that may provide, for example, accurate and jitter-free registration and rendering of display elements on an NTE display device.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A six degree-of-freedom optical tracker system, comprising:
    a structure adapted to be disposed on a subject and moveable to a position and orientation;
    a plurality of light emitting diodes (LEDs) mounted on the structure and disposed on the structure at a specific position relative to a reference position, each LED coupled to receive a drive current and configured, upon receipt of the drive current, to emit light;
    an LED controller coupled to the LEDs and configured to supply the drive current to each of the LEDs in a manner that causes the LEDs to sequentially and individually emit light;
    a fixedly mounted position sensing device spaced apart from, and non-movable relative to, each of the LEDs, the position sensing device having a field of view (FOV) and having a gain that is variable, the position sensing device configured to receive the light emitted from each of the LEDs within the FOV and to supply position data for each LED; and
    a processor coupled to receive the position data supplied from the position sensing device, the processor configured to implement a structure model and a camera model, the structure model including 3D locations of each LED relative to a predefined origin on the structure, the camera model including lens and sensor parameters determined during a calibration procedure, the processor configured, upon receipt of the position data, to:
        (i) determine the position and orientation of the structure relative to the position sensing device based on the position data and the specific position of each LED relative to the reference position,
        (ii) determine if one or more of the LEDs is outside of the FOV of the position sensing device,
        (iii) disable only the one more LEDs determined to be outside of the FOV of the position sensing device,
        (iv) continuously enable the LEDs not determined to be outside of the FOV of the position sensing device; and
        (v) selectively vary the gain of the position sensing device based on the light emitted from each of the LEDs and the ambient light conditions.

2. The system of claim 1, wherein the processor is in operable communication with the LED controller and is further configured to command the LED controller to supply the drive current to each of the LEDs.

3. The system of claim 1, wherein:
    the processor is further configured to supply a plurality of timing pulses to the LED controller; and
    the LED controller is configured, upon receipt of the timing pulses, to supply the drive current to each of the LEDs.

4. The system of claim 3, wherein the timing pulses comprise:
    a series of sync pulses, each sync pulse supplied at a predetermined periodicity;
    a plurality of individual LED pulses supplied between each of the sync pulses, each the individual LED pulses associated with a different one of the LEDs, and each of the individual LED pulses supplied a predetermined number of times between each of the sync pulses.

5. The system of claim 1, wherein:
    the LED controller comprises a plurality of LED driver amplifiers, each driver amplifier having a gain that is variable, and each driver configured to supply the drive current to a different one of the LEDs; and
    the processor is further configured to selectively command the LED controller to vary the drive current to one or more of the LEDs, vary the gain of one or more LED driver amplifiers, or both.

6. A method of detecting position and orientation of a structure using a single position detecting device that has a field of view (FOV) and a variable gain, and that is spaced apart from, and non-movably mounted relative to, the structure, the method comprising the steps of:
    sequentially and individually supplying drive current from an LED controller to a plurality of light emitting diodes (LEDs) that are mounted on the structure to thereby sequentially and individually cause the LEDs to emit light, each LED being mounted on the structure at a specific position relative to a reference position;
    generating, using the single position sensing device, position data for each LED from the light that is emitted from each of the LEDs within the FOV of the single position sensing device;
    processing, in a processor that implements a structure model and a camera model, the position data and the specific position of each of the LEDs relative to the reference position to determine (i) the position and orientation of the structure relative to the single position sensing device and (ii) if one or more of the LEDs is outside of the FOV of the position sensing device; and using the processor to selectively command the LED controller to vary the drive current to one or more of the LEDs; and using the processor to (i) disable only the one more LEDs determined to be outside of the FOV of the position sensing device, (ii) continuously enable the LEDs not determined to be outside of the FOV of the position sensing device, and (iii) selectively vary the gain of the position sensing device based on the light emitted from each of the LEDs and ambient light conditions, wherein:

the structure model includes 3D locations of each LED relative to a predefined origin on the structure, and the camera model includes lens and sensor parameters determined during a calibration procedure.

7. The method of claim 6, further comprising:

supplying a plurality of timing pulses from the processor to the LED controller; and supplying the drive current from the LED controller to each of the LEDs in response to the timing pulses.

8. The method of claim 7, wherein the timing pulses comprise:

a series of sync pulses, each sync pulse supplied at a predetermined periodicity;

a plurality of individual LED pulses supplied between each of the sync pulses, each of the individual LED pulses associated with a different one of the LEDs, and each of the individual LED pulses supplied a predetermined number of times between each of the sync pulses.

\* \* \* \* \*